US009706871B2

(12) United States Patent
Matthijs

(10) Patent No.: US 9,706,871 B2
(45) Date of Patent: Jul. 18, 2017

(54) HEATING DEVICE FOR A KETTLE

(71) Applicant: STUDIO CQ (GUANGZHOU) LTD, Guangzhou, Guangdong (CN)

(72) Inventor: Pot Matthijs, Guangzhou (CN)

(73) Assignee: STUDIO CQ (GUANGZHOU) LTD, Guangzhou (CN)

( * ) Notice: Subject to any disclaimer, the term of this patent is extended or adjusted under 35 U.S.C. 154(b) by 277 days.

(21) Appl. No.: 14/402,701

(22) PCT Filed: Feb. 1, 2013

(86) PCT No.: PCT/CN2013/071289
§ 371 (c)(1),
(2) Date: Nov. 21, 2014

(87) PCT Pub. No.: WO2013/174160
PCT Pub. Date: Nov. 28, 2013

(65) Prior Publication Data
US 2015/0122796 A1 May 7, 2015

(30) Foreign Application Priority Data

May 23, 2012 (CN) .................... 2012 2 0237528 U

(51) Int. Cl.
A47J 27/21 (2006.01)
A47J 36/26 (2006.01)
A47J 36/24 (2006.01)

(52) U.S. Cl.
CPC ..... *A47J 27/21041* (2013.01); *A47J 27/2105* (2013.01); *A47J 27/21166* (2013.01); *A47J 36/2483* (2013.01)

(58) Field of Classification Search
None
See application file for complete search history.

(56) References Cited

U.S. PATENT DOCUMENTS 3,780,794 A * 12/1973 Staub ........................ A47F 3/04
126/21 A
3,962,962 A * 6/1976 Anderson ........... A47J 36/2483
219/386
5,842,353 A 12/1998 Kuo-Liang
(Continued)

FOREIGN PATENT DOCUMENTS

CN 201234884 Y 5/2009
CN 201879505 U 6/2011
(Continued)

OTHER PUBLICATIONS

International Search Report of PCT Patent Application No. PCT/CN2013/071289 issued on May 2, 2013.

*Primary Examiner* — Joseph M Pelham

(57) ABSTRACT

The present invention discloses a heating device for a kettle, comprising an enclosure, a radiator fan, a rack, a core PCB, a wire coil, and a temperature sensor in the enclosure. A heating platform which has a housing cavity is arranged on the upper part of the enclosure. The radiator fan is mounted at the bottom of the enclosure. The rack is fixed inside the enclosure. The core PCB is configured in the lower part of the rack and above the radiator fan. The wire coil which is provided with a heat coil is installed on the rack, and the temperature sensor is electrically connected with the core PCB.

10 Claims, 5 Drawing Sheets

(56) References Cited

U.S. PATENT DOCUMENTS

| | | | |
|---|---|---|---|
| 6,403,928 B1 | 6/2002 | Ford | |
| 6,674,052 B1 * | 1/2004 | Luo | A47J 41/0077 |
| | | | 219/432 |
| 2014/0014641 A1 * | 1/2014 | Propes | A61L 9/03 |
| | | | 219/421 |

FOREIGN PATENT DOCUMENTS

| | | | | |
|---|---|---|---|---|
| EP | 0026756 A1 | 4/1981 | | |
| ES | WO 9726490 A1 * | 7/1997 | ......... | A47J 36/2483 |
| GB | 2374274 A | 10/2002 | | |

* cited by examiner

HEATING DEVICE FOR A KETTLE

TECHNICAL FIELD

The present invention relates to a heating device, and more especially to a kettle heating device.

BACKGROUND

The heating base for electric kettles available on the market currently is simple and is undesirable in the following aspects:

1. the water heated in the kettle placed on the heating base transfers heat to the wall of the kettle, and the user is prone to be scalded due to accidental contact of the wall, so the security is low;

2. the heating base is not provided with a thermal insulation device, so the hot water in the kettle may become cool soon after heating and re-heating is required after a short period, thus the energy consumption is high;

3. The kettle is prone to move on the heating base left and right, and even slip from the heating base.

SUMMARY

To address the deficiencies in the prior art, the present invention aims at providing a heating device for a kettle featuring high security, desirable thermal insulation, low energy consumption, and capability of avoiding left-right movement of the kettle and preventing slipping of the kettle.

To realize the objective of the present invention, the following technical solution is adopted:

a heating device for a kettle, comprising an enclosure, a radiator fan, a rack, a core PCB, a wire coil, and a temperature sensor in the enclosure, wherein a heating platform which has a housing cavity for accommodating the kettle is arranged on the upper part of the enclosure, the radiator fan is mounted at the bottom of the enclosure, the rack is fixed inside the enclosure, the core PCB is configured in the lower part of the rack and above the radiator fan, the wire coil which is provided with a heat coil is installed on the rack, the temperature sensor which is electrically connected with the core PCB extends into the housing cavity of the heating platform after passing through the rack, and the wire coil in turn upwards.

Preferably, a middle-through connection post is centered in the rack, the wire coil is provided with a connection hole fit for the connection post and sheathed into the connection post via the connection hole.

Preferably, the temperature sensor sheathed with a spring which is in the through hole of the connection post passes through the connection post, and a baffle obstructing the spring is arranged in the through hole of the connection post.

Preferably, the periphery in the upper part of the rack extends upwards to form several first installation posts with holes, and the bottom of the heating platform extends downwards to form several positioning posts corresponding to the first installation posts one by one, wherein the positioning posts are inserted into the holes of the corresponding first installation posts.

Preferably, the periphery in the lower part of the rack extends downwards to form several fastening posts, and the bottom of the enclosure extends upwards to form several second installation posts with holes corresponding to the fastening posts one by one, wherein the fastening posts are inserted into the holes of the corresponding second installation posts.

Preferably, the lower part of the rack extends downwards to form several connection rods, and correspondingly, the core PCB is provided with several hollow holes corresponding to the connection rods one by one, wherein the connection rods are inserted into the hollow holes.

Preferably, the enclosure is provided with a control button which is connected with the core PCB through button PCB.

Preferably, a temperature fuse cover is further included, wherein a fuse connecting the core PCB and external power is mounted inside the temperature fuse cover installed at the bottom of the heating platform and exposed from the bottom of the housing cavity.

Preferably, several silicone cushions for supporting the kettle are configured at the bottom of the housing cavity.

Preferably, several rubber cushions are configured at the bottom of the enclosure.

The heating device for a kettle according to the present invention has the following favourable effects: by providing a heating platform with a housing cavity arranged on the enclosure, when in use, the kettle is placed in the housing cavity and fixed by means of the wall part of the housing cavity, thus avoiding left and right movement of the kettle on the heating platform, preventing the slipping of the kettle, offering thermal insulation function for the kettle and reducing energy consumption; moreover, the wall part of the housing cavity can also prevent the user from accidental contact of the heated wall, in this way to putting an end to accidental scalding and greatly improving safety; furthermore, the heating device of the present invention not only can heat water, but also other liquids.

DESCRIPTION OF THE REFERENCE NUMBERS IN THE DRAWINGS

Figure 1:
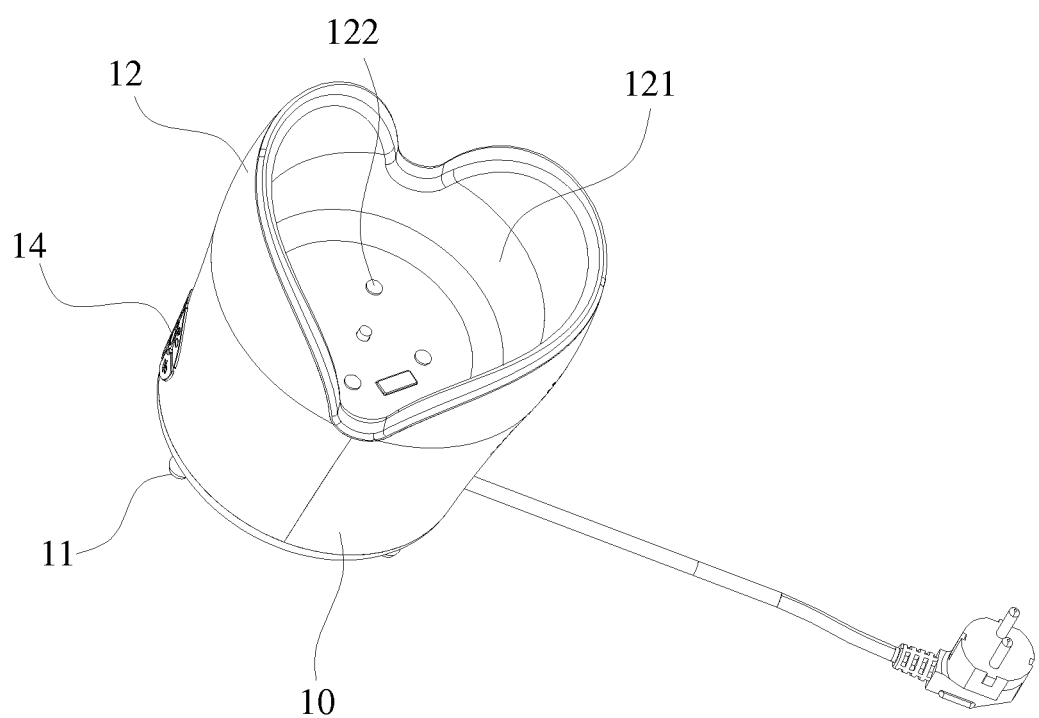
FIG. 1 is a structural view of the embodiment of the present invention.
Figure 2:
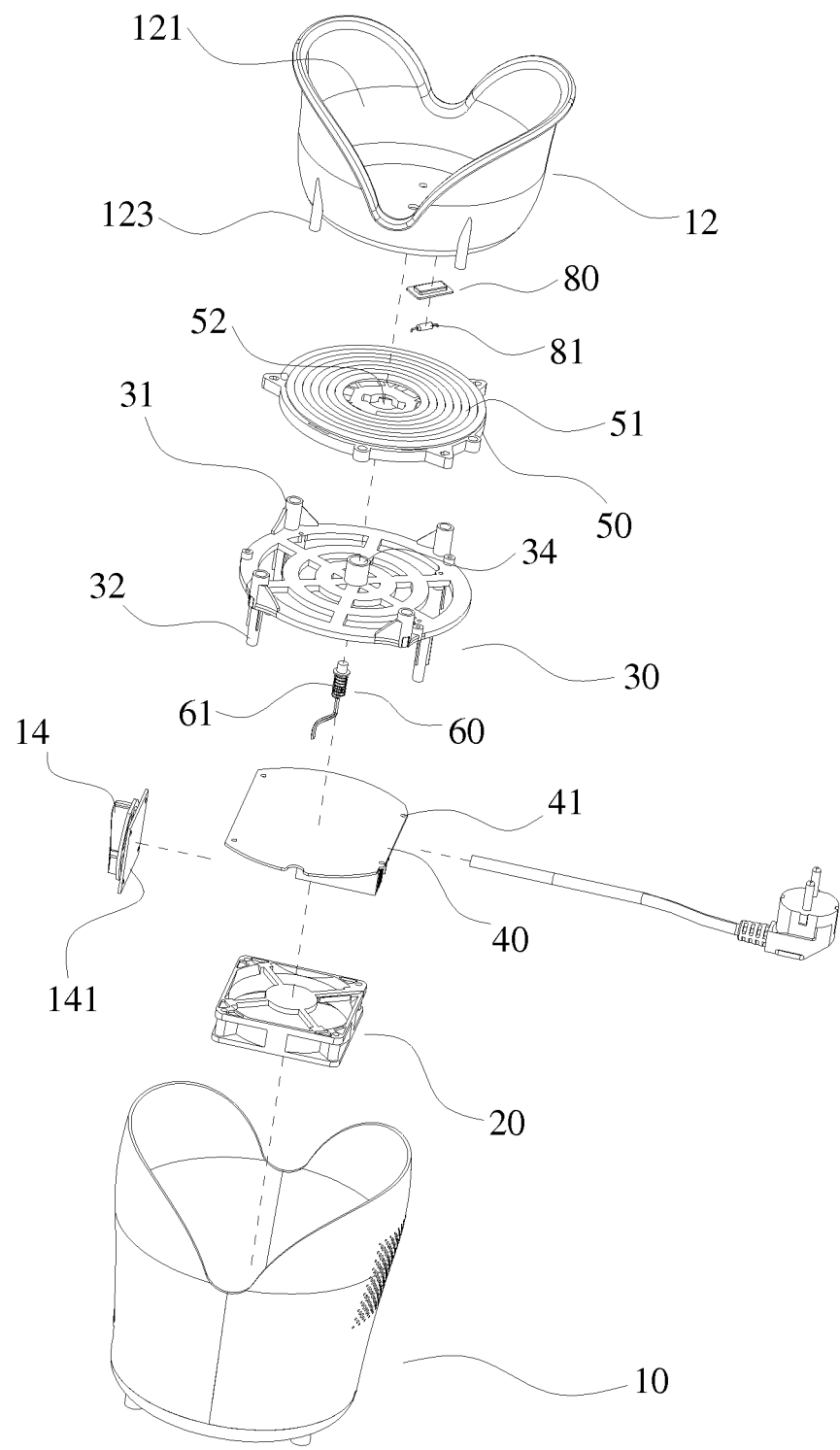
FIG. 2 is an exploded view of the embodiment of the present invention.
Figure 3:
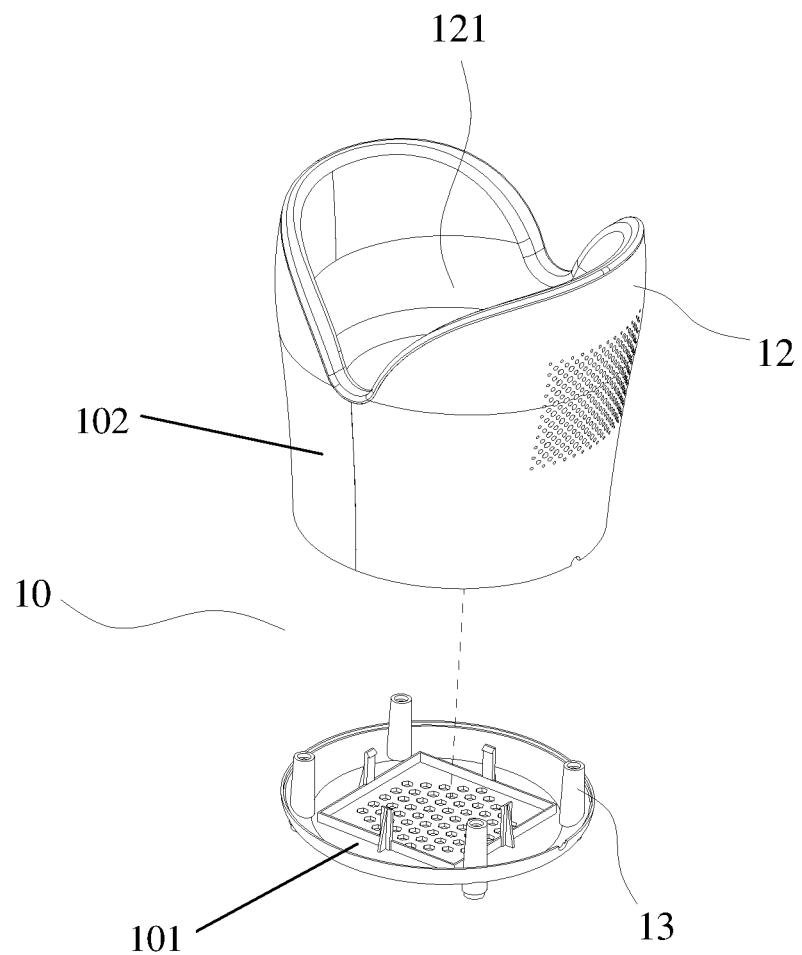
FIG. 3 is a structural view of the enclosure in the embodiment of the present invention.
Figure 4:
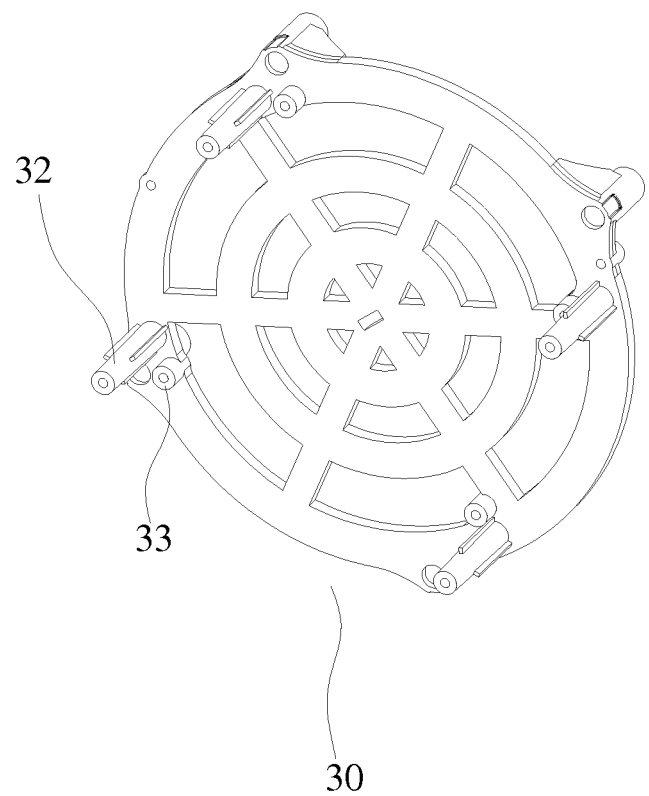
FIG. 4 is a structural view of the rack in the embodiment of the present invention.

- 10. enclosure 11. rubber cushion; 12. heating platform; 121. housing cavity; 122. silicone cushion; 123. positioning post; 13. second installation post; 14. control button; 141. button PCB;
- 20. radiator fan;
- 30. rack; 31. first installation post; 32. fastening post; 33. connection rod; 34. connection post;
- 40. core PCB; 41. hollow hole;
- 50. wire coil; 51. heat coil; 52. connection hole;
- 60. temperature sensor; 61. spring;
- 70. kettle;
- 80. temperature fuse cover; 81. temperature fuse.

DETAILED DESCRIPTION

The present invention will be further detailed hereinafter in conjunction with the embodiments and accompanying drawings.

FIGS. 1~4 show the structure of a preferred embodiment of the present invention. A heating device for a kettle, comprising an enclosure 10 having a bottom plate 101 and a side wall 102 extending upwards from an edge of the bottom plate of the enclosure, a radiator fan 20, a rack 30, a core PCB 40, a wire coil 50, and a temperature sensor 60 in the enclosure 10, wherein:

Several rubber cushions 11 are configured at the bottom of the enclosure 10, a heating platform 12 which has a housing cavity 121 for accommodating the kettle 70 is arranged on the upper part of the enclosure 10, several silicone cushions 121 for supporting the kettle 70 are configured at the bottom of the housing cavity 121.

The radiator fan 20 is mounted at the bottom of the enclosure 10 to dissipate heat of the core PCB 40.

The rack 30 is fixed inside the enclosure 10, the periphery in the upper part of the rack 30 extends upwards to form several first installation posts 31 with holes, and the bottom of the heating platform 12 extends downwards to form several positioning posts 123 corresponding to the first installation posts 31 one by one, wherein the positioning posts 123 are inserted into the holes of the corresponding first installation posts 31; the periphery in the lower part of the rack 30 extends downwards to form several fastening posts 32, and the bottom of the enclosure 10 extends upwards to form several second installation posts 13 with holes corresponding to the fastening posts 32 one by one, wherein the fastening posts 32 are inserted into the holes of the corresponding second installation posts 13; moreover, the lower part of the rack 30 extends downwards to form several connection rods 33, and correspondingly, the core PCB 40 is provided with several hollow holes 41 corresponding to the connection rods 33 one by one, wherein the core PCB 40 which is configured in the lower part of the rack 30 and above the radiator fan 20 is inserted into the corresponding hollow holes 41 via the connection rods 33.

The wire coil 50 which is provided with a heat coil 51 is installed on the rack 30, the temperature sensor 60 which is electrically connected with the core PCB 40 extends into the housing cavity 121 of the heating platform 12 after passing through the rack 30 and the wire coil 50 in turn upwards. Specifically, a middle-through connection post 34 is centered in the rack 30, the wire coil 50 is provided with a connection hole 52 fit for the connection post 34 and sheathed into the connection post 34 via the connection hole 52, the temperature sensor 60 sheathed with a spring 61 which is in the through hole of the connection post 34 passes through the connection post 34, and a baffle obstructing the spring 61 is arranged in the through hole of the connection post 34.

The enclosure 10 is provided with a control button 14 which is connected with the core PCB 40 through button PCB 141. When in use, the heating device can be conveniently controlled by means of the control button 14.

To increase security, a temperature fuse cover 80 is further included in the heating device, wherein a fuse 81 connecting the core PCB 40 and external power is mounted inside the temperature fuse cover 80 installed at the bottom of the heating platform 12 and exposed from the underside of the housing cavity 121.

Figure 5:
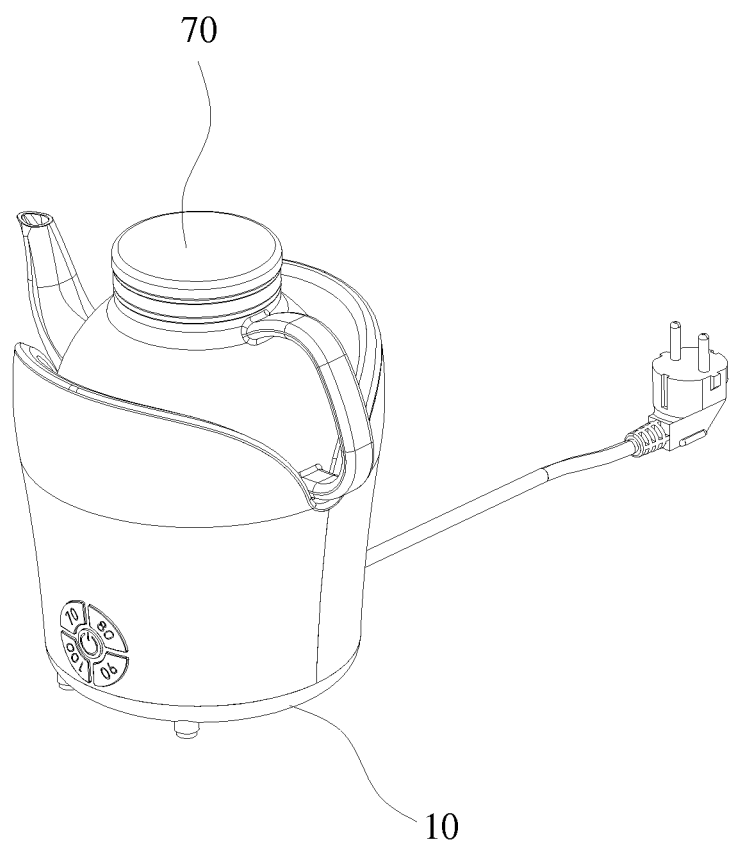
FIG. 5 is a view of the using states of embodiment of the present invention.

As shown in FIG. 5, when in use, the kettle 70 made of glass or stainless steel, filled with water or other liquid, is placed in the housing cavity 121 of the heating platform 12, the wall part of the housing cavity 121 fixes the kettle 70 to avoid left and right movement of the kettle 70 on the heating platform 12, prevent the slipping of the kettle 70 and offer thermal insulation function for the kettle 70, thus reducing energy consumption. Moreover, the wall part of the housing cavity 121 can also prevent the user from accidental contact of the heated wall, in this way to put an end of accidental scald and greatly improve safety.

The description above is only the preferred embodiment of the present invention other than the limitation to technical scope of the invention in any form. Any slight modification, equivalent change or improvement to the embodiment above based on the technical essence of the present invention is considered within the protection range of the technical solution of the present invention.

What is claimed is:

1. A heating device for a kettle, comprising:
   an enclosure having a bottom plate and a side wall extending upwards from an edge of the bottom plate of the enclosure,
   a radiator fan mounted on top of the bottom plate of the enclosure,
   a rack fixed inside the enclosure and disposed above the radiator fan,
   a core PCB connected to the rack and disposed underneath the rack and above the radiator fan,
   a wire coil frame installed on the rack and with a heat coil provided thereon, and
   a temperature sensor in the enclosure,
   wherein a heating platform which defines a housing cavity for accommodating the kettle is arranged on an upper end of the side wall of the enclosure, and
   the temperature sensor is electrically connected with the core PCB and extends into the housing cavity of the heating platform after passing through the rack, and the wire coil frame sequentially from bottom to top.

2. The heating device for a kettle as claimed in claim 1, wherein a connection post having a middle-through hole is centered in the rack, the wire coil frame is provided with a connection hole fit for the connection post and sheathed into the connection post via the connection hole.

3. The heating device for a kettle as claimed in claim 2, wherein the temperature sensor is sheathed with a spring which is in the middle-through hole of the connection post and passes through the connection post, and a baffle obstructing the spring is arranged in the middle-through hole of the connection post.

4. The heating device for a kettle as claimed in claim 1, wherein a plurality of first installation posts with holes extend upwards from an upper edge of the rack, and a plurality of positioning posts extend downwards from a lower surface of the heating platform, corresponding to the first installation posts one by one, wherein the positioning posts are inserted into the holes of the corresponding first installation posts.

5. The heating device for a kettle as claimed in claim 1, wherein a plurality of fastening posts extend downwards from a lower edge of the rack, and a plurality of second installation posts with holes extend upwards from an upper surface of the bottom plate of the enclosure, corresponding to the fastening posts one by one, wherein the fastening posts are inserted into the holes of the corresponding second installation posts.

6. The heating device for a kettle as claimed in claim 1, wherein a plurality of connection rods are provided at a bottom of the rack, and correspondingly, the core PCB is provided with a plurality of hollow holes corresponding to the connection rods one by one, wherein the connection rods are inserted into the hollow holes.

7. The heating device for a kettle as claimed in claim 1, wherein the enclosure is provided with a control button which is connected with the core PCB through a button PCB.

8. The heating device for a kettle as claimed in claim 1, further comprising a temperature fuse cover installed at a bottom of the heating platform and exposed from a bottom of the housing cavity, wherein a fuse connecting the core PCB and an external power is mounted inside the temperature fuse cover.

9. The heating device for a kettle as claimed in claim 1, wherein a plurality of silicone cushions for supporting the kettle are configured at a bottom of the housing cavity.

10. The heating device for a kettle as claimed in claim 1, wherein a plurality of rubber cushions are configured at a bottom of the bottom plate of the enclosure.

\* \* \* \* \*